(12) United States Patent
Kitani

(10) Patent No.: US 9,571,346 B2
(45) Date of Patent: Feb. 14, 2017

(54) FAULT TOLERANT COMMUNICATION SYSTEM, METHOD, AND DEVICE THAT USES TREE SEARCHING

(71) Applicant: HITACHI, LTD., Tokyo (JP)

(72) Inventor: Makoto Kitani, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 149 days.

(21) Appl. No.: 14/638,791

(22) Filed: Mar. 4, 2015

(65) Prior Publication Data

US 2015/0280998 A1   Oct. 1, 2015

(30) Foreign Application Priority Data

Mar. 31, 2014  (JP) ................. 2014-070988

(51) Int. Cl.
*H04L 12/26* (2006.01)
*H04L 12/24* (2006.01)

(52) U.S. Cl.
CPC ....... *H04L 41/0896* (2013.01); *H04L 41/0654* (2013.01)

(58) Field of Classification Search
CPC .... H04L 41/06; H04L 41/0672; H04L 41/085; H04L 41/0889; H04L 41/0893
USPC ........................ 370/216, 218, 225
See application file for complete search history.

(56) References Cited

U.S. PATENT DOCUMENTS

| 8,199,755 | B2* | 6/2012 | Ashwood-Smith | H04L 45/02 370/389 |
| 8,264,962 | B2* | 9/2012 | Vasseur | H04L 12/5695 370/235 |
| 8,527,616 | B2* | 9/2013 | Kitani | H04L 41/0816 370/252 |
| 8,761,004 | B2* | 6/2014 | Yamashita | H04L 12/462 370/225 |
| 9,094,330 | B2* | 7/2015 | Takase | H04L 45/02 |
| 2006/0193247 | A1* | 8/2006 | Naseh | H04L 45/04 370/216 |
| 2013/0022052 | A1 | 1/2013 | Takase et al. | |
| 2015/0271056 | A1* | 9/2015 | Chunduri | H04L 45/02 370/238 |

FOREIGN PATENT DOCUMENTS

JP          201326829 A    2/2013

* cited by examiner

*Primary Examiner* — Dmitry H Levitan
(74) *Attorney, Agent, or Firm* — Volpe and Koenig, P.C.

(57) ABSTRACT

Trees employing the following two elements are used to determine communicable ranges: paths within a transmission network that are set for data transfer between adjacent communicating devices; and the adjacent communicating devices located at both ends of the paths. The adjacent communicating devices corresponding to the roots of the trees are called adjacent communicating devices located at both ends of a path that has become incommunicable due to a fault within the transmission network.

5 Claims, 15 Drawing Sheets

FIG. 3

|  | TRANSMITTING DEVICE | STATUS | PORT (STATUS) |
|---|---|---|---|
| 411 | TRANSMITTING DEVICE A | NORMAL | 1/1(NORMAL), 2/1(NORMAL), 2/2(NORMAL) |
| 412 | TRANSMITTING DEVICE B | NORMAL | 1/1(NORMAL), 1/2(NORMAL), 2/1(NORMAL) |
| 413 | TRANSMITTING DEVICE C | NORMAL | 1/1(NORMAL), 1/2(NORMAL), 2/1(NORMAL) |
| 414 | TRANSMITTING DEVICE D | NORMAL | 1/1(NORMAL), 1/2(NORMAL), 2/2(NORMAL) |

|  | PHYSICAL LINK | DEVICE α (PORT) | DEVICE β (PORT) | STATUS |
|---|---|---|---|---|
| 431 | 20-1 (LINK BETWEEN B AND C) | B(1/1) | C(1/1) | NORMAL |
| 432 | 20-2 (LINK BETWEEN B AND D) | B(2/1) | D(1/1) | NORMAL |
| 433 | 20-3 (LINK BETWEEN A AND B) | A(1/1) | B(1/2) | NORMAL |
|  | ... | ... | ... | ... |
| 434 | 20-5 (LINK BETWEEN A AND ROUTER a) | A(2/1) | a(-) | NORMAL |
|  | ... | ... | ... | ... |

| | ADJACENT ROUTER | STATUS | HOUSING LINK | USAGE PATHS | GROUP |
|---|---|---|---|---|---|
| 451 | ROUTER a | NORMAL | 20-5 | 30-1, 30-2, 30-3, ... | 1 |
| 452 | ROUTER b | NORMAL | 20-6 | 30-1, ... | 1 |
| 453 | ROUTER c | NORMAL | 20-7 | 30-2, 30-4, ... | 1 |
| 454 | ROUTER d | NORMAL | 20-8 | 30-3, 30-4, ... | 1 |

(columns: 441, 442, 443, 444, 445)

| | NETWORK INFORMATION | ADVERTISING ROUTER | GROUP | ATTRIBUTE INFORMATION |
|---|---|---|---|---|
| 491 | X | ROUTER a | 1 | ... |
| 492 | Y | ROUTER a | 1 | ... |
| 493 | Y | ROUTER c | 1 | ... |
| | ... | ... | ... | ... |
| 494 | W | ROUTER d | 1 | ... |
| | ... | ... | ... | ... |

(columns: 481, 482, 483, 484)

F I G. 7

|  | PATH | ADJACENT ROUTERS | CONSTITUENT LINKS | STATUS |
|---|---|---|---|---|
| 471 | 30-1 (PATH BETWEEN a AND b) | ROUTERS a AND b | 20-5, 20-6 | NORMAL |
| 472 | 30-2 (PATH BETWEEN a AND c) | ROUTERS a AND c | 20-1, 20-3, 20-5, 20-7 | NORMAL |
| 473 | 30-3 (PATH BETWEEN a AND d) | ROUTERS a AND d | 20-2, 20-3, 20-5, 20-8 | NORMAL |
|  | ... | ... | ... | ... |
| 474 | 30-4 (PATH BETWEEN c AND d) | ROUTERS c AND d | 20-4, 20-7, 20-8 | NORMAL |
|  | ... | ... | ... | ... |

461 / 462 / 463 / 464 — 154

F I G. 1 0

| | NETWORK INFORMATION | ADVERTISING ROUTER | OLD GROUP | NEW GROUP |
|---|---|---|---|---|
| 513 | Y | ROUTER c | 1 | 2 |
| | ... | ... | ... | ... |
| 514 | W | ROUTER d | 1 | 2 |
| | ... | ... | ... | ... |

Columns: 501, 502, 503, 504 — Table 156

F I G. 1 2
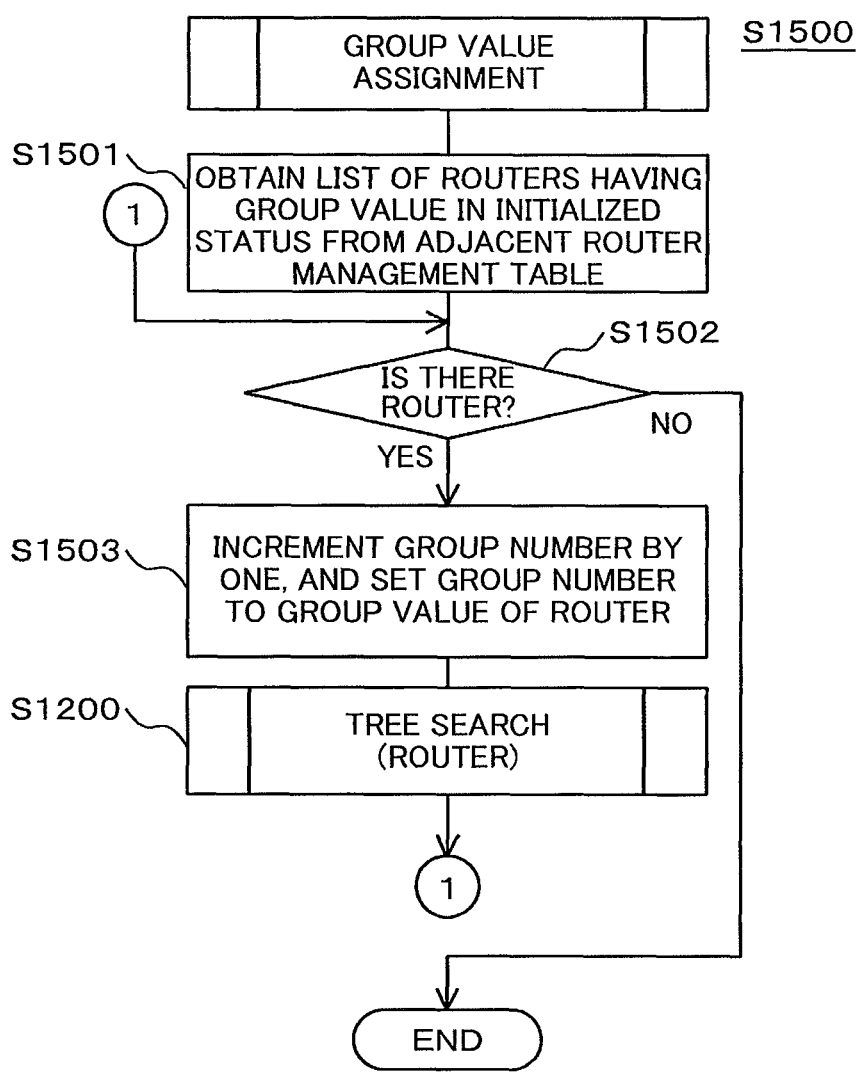

F I G. 1 4
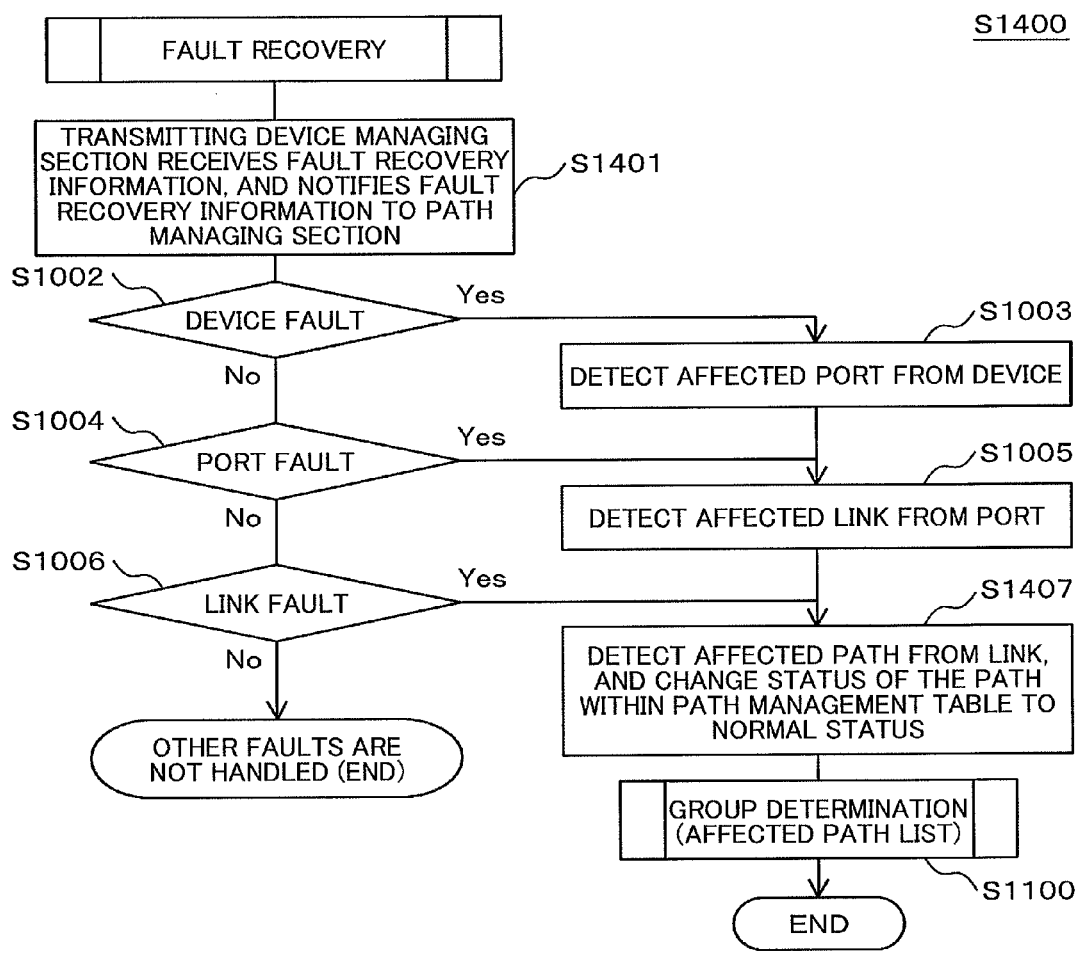

F I G. 1 5
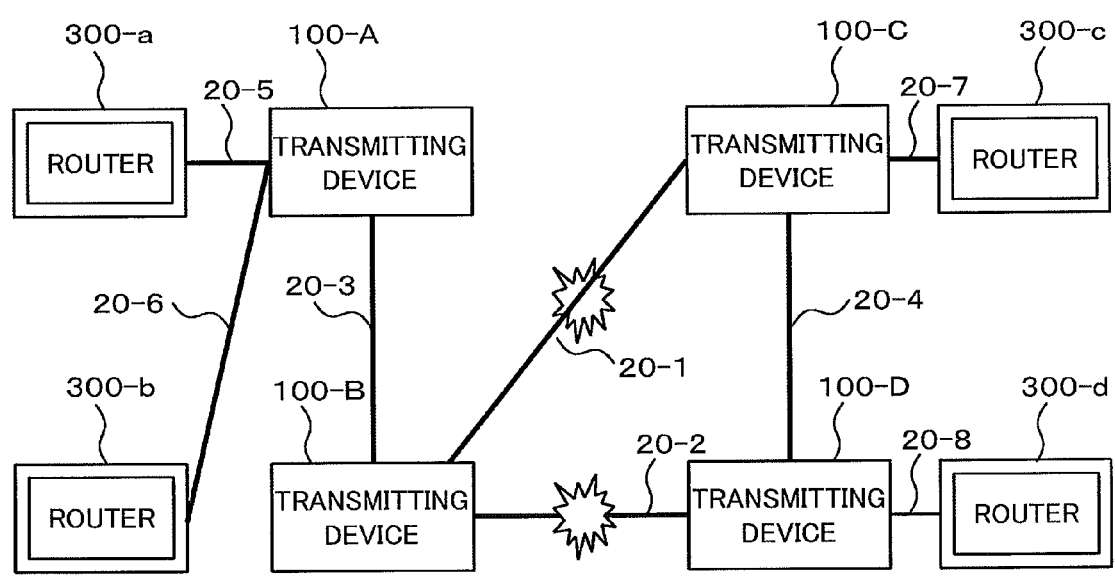

| | PHYSICAL LINK | DEVICE α (PORT) | DEVICE β (PORT) | STATUS |
|---|---|---|---|---|
| 431 | 20-1 (LINK BETWEEN B AND C) | B(1/1) | C(1/1) | FAULTY |
| 432 | 20-2 (LINK BETWEEN B AND D) | B(2/1) | D(1/1) | FAULTY |
| 433 | 20-3 (LINK BETWEEN A AND B) | A(1/1) | B(1/2) | NORMAL |
| | ... | ... | ... | ... |
| 434 | 20-5 (LINK BETWEEN A AND ROUTER a) | A(2/1) | a(-) | NORMAL |
| | ... | ... | ... | ... |

| | PHYSICAL LINK | ADJACENT ROUTERS | CONSTITUENT LINKS | STATUS |
|---|---|---|---|---|
| 471 | 30-1 (PATH BETWEEN a AND b) | 17-1 ROUTERS a AND b | 20-5, 20-6 | NORMAL |
| 472 | 30-2 (PATH BETWEEN a AND c) | 17-2 ROUTERS a AND c | 20-1, 20-3, 20-5, 20-7 | FAULTY |
| 473 | 30-3 (PATH BETWEEN a AND d) | 17-3 ROUTERS a AND d | 20-2, 20-3, 20-5, 20-8 | FAULTY |
| | ... | ... | ... | ... |
| 474 | 30-4 (PATH BETWEEN c AND d) | 17-4 ROUTERS c AND d | 20-4, 20-7, 20-8 | NORMAL |
| | ... | ... | ... | ... |

| | ADJACENT ROUTER | STATUS | HOUSING LINK | USAGE PATHS | GROUP |
|---|---|---|---|---|---|
| 451 | ROUTER a | NORMAL | 20-5 | 30-1, 30-2, 30-3, ... | 1 |
| 452 | ROUTER b | NORMAL | 20-6 | 30-1, ... | 1 |
| 453 | ROUTER c | NORMAL | 20-7 | 30-2, 30-4, ... | 2 |
| 454 | ROUTER d | NORMAL | 20-8 | 30-3, 30-4, ... | 2 |

| | NETWORK INFORMATION | ADVERTISING ROUTER | GROUP | ATTRIBUTE INFORMATION |
|---|---|---|---|---|
| 491 | X | ROUTER a | 1 | ... |
| 492 | Y | ROUTER a | 1 | ... |
| 493 | Y | ROUTER c | 2 | ... |
| | ... | ... | ... | ... |
| 494 | W | ROUTER d | 2 | ... |
| | ... | ... | ... | ... |

481 482 483 484

FAULT TOLERANT COMMUNICATION SYSTEM, METHOD, AND DEVICE THAT USES TREE SEARCHING

CLAIM OF PRIORITY

The present application claims priority from Japanese patent application serial no. 2014-070988, filed on Mar. 31, 2014, the content of which is hereby incorporated by reference into this application.

BACKGROUND OF THE INVENTION

The present invention relates to a technology for knowing the division of a communication range which occurs at a time of a fault and for maintaining communication in a system that manages and controls a network including a plurality of communicating devices.

There are a transmission network and an Internet Protocol (IP) network, the transmission network including a plurality of transmitting devices that set in advance the information on data to be transferred in devices corresponding to an entry and an exit before transferring the data, the IP network including a plurality of routers (referred to also as "communicating devices") that determine the destination of packet transfer on the basis of an IP address. Network control on the IP network dynamically selects an optimum path on the basis of the condition of the entire network in accordance with a network control packet of an IP path control protocol including Border Gateway Protocol (BGP) and a signaling protocol including Resource Reservation Protocol (RSVP), for example. However, in a case where a fault has occurred, the transmission network would select an alternative path designed in advance. On the network where the IP network and the transmission network are connected to each other, another network may be selected as an optimum path by the path selection of the IP network even though it may be better to transfer data via the transmission network depending on the condition of the fault that has occurred.

In order to make the differences in such network control systems less influential, JP-2013-026829-A discloses a system in which the IP path control protocol and the signaling protocol are analyzed with a general-purpose server. A result of the analysis is then converted into a setting for transmitting devices so that the control of a transmission network and the control of an IP network are operatively associated with each other. JP-2013-026829-A discloses a server that makes the transmission network virtually behave as one router and functions as a virtual router. This server is connected to adjacent routers by transmitting and receiving network control packets to and from the adjacent routers, converts a result of processing of the network control packets to and from the routers into a path setting for the transmission network, and sets a path connecting the routers within the transmission network. The virtual router thereby constructs a network for data transfer in the system. This system makes the setting of the transmission network operatively associated with the network control of the IP network, whereby the transmission network and the IP network are unified by the network control of the IP network. Thus a mismatch in path selection at the time of a fault is eliminated.

SUMMARY OF THE INVENTION

In JP-2013-026829-A, the transmission network is controlled as one router. However, this way causes the following problems.

The transmission network is a network including a plurality of transmitting devices. There is a possibility of a fault (specifically the disconnection of a cable, a failure of a transmitting device that is not redundant, or the like) that could occur within the transmission network, resulting in the transmission network being divided into a plurality of partial networks. In the present Description, this divided state will be referred to as "area division".

This area division could affect some paths within the transmission network forming a network for data transfer so as to make the paths unable to communicate as the fault of the transmitting device. However, paths unaffected by the fault remain able to communicate. Thus, the network for data transfer is divided into a communicable range and an incommunicable range. A communicable range in a certain divided area and a communicable range in another area are different. That is, in order to conform to the network control of the IP network, path information corresponding to communicable paths within the transmission network needs to be advertised to adjacent routers although the contents of the information differ depending on the areas. Due to the fault present within the transmission network, the adjacent routers do not detect the fault within the transmission network. Since the transmitting devices relay network control packets between the router adjacent to the transmitting device on a different network from the network for data transfer and the server functioning as a virtual router, the adjacent routers do not recognize that the fault has occurred. Consequently, a response at the time of occurrence of the fault may not be made spontaneously.

JP-2013-026829-A does not disclose a mechanism for advertising a communicable range matching each of the adjacent routers in cases where area division has occurred. There is no other choice but to advertise all of path information as if nothing had happened. A faulty path will be not communicable as a consequence.

At this time, because the transmission network behaves as one virtual router, it is possible to treat the whole transmission network as being incommunicable under the name of "device fault". However, the incommunicable state of the whole important transmission network extending over a wide area has a great impact. As long as there is a communicable range, if small at least, the transmission network should behave so as to allow communication.

Even if path information may be advertised to each area, path calculation could not be performed once another router than an adjacent router receives path information of different contents from the same router. The technique in JP-2013-026829-A hence may not solve the problem. However, this condition may happen in actual network operations.

It is an object of the present invention to provide a communication system, a communication control method, and a control device that allow communication to continue within partial networks even if area division has occurred.

In order to solve the above problems, trees employing the following two elements are used to determine communicable ranges: paths within a transmission network that are set for data transfer between adjacent communicating devices; and the adjacent communicating devices located at both ends of the paths. The adjacent communicating devices corresponding to the roots of the trees are called adjacent communicating devices located at both ends of a path that has become incommunicable due to a fault within the transmission network.

The numbers of different groups are added in advance before the trees having, as the roots thereof, the adjacent communicating devices at both ends of the path in which the fault has occurred are calculated. If the adjacent communicating devices have different group numbers after the calculation of each of the trees, it is determined that a range of communication has been divided. A communicable range is set between adjacent communicating devices having the same group number. When a virtual communicating device advertises path information advertised from an adjacent communicating device to another adjacent communicating device, the virtual communicating device refers to the group numbers and then advertises the path information. The target adjacent communicating device is thereby determined.

Irrespective of whether a fault has occurred or whether recovery from a fault has been made, there consequently occurs an affected path. Thus, when trees are calculated from adjacent communicating devices corresponding to both ends of the affected path, a group of a range in which adjacent communicating devices may communicate with each other is calculated in the same procedure at the time of fault occurrence and fault recovery. Since grouping and group integration are performed internally, it is possible to continue service in communicable ranges without changing the setting information of the adjacent communicating devices.

The above object may be achieved by a control device in a communication system, the communication system with a transmission network including: a plurality of transmitting devices configured to set in advance information on data to be transferred in an entry device and an exit device and transfer the data; an IP network including a plurality of communicating devices configured to determine a destination of data transfer on a basis of an IP address; and the control device configured to manage the transmitting devices and connect the transmitting devices and the communicating devices by use of network control packets on the IP network. The control device treats the transmission network as one virtual communicating device, converts information on the plurality of transmitting devices into the network control packets, and is connected to the communicating devices. The control device includes: a transmitting device managing section configured to control and manage the plurality of transmitting devices; a virtual communicating device functional section connected to the plurality of communicating devices by use of the network control packets; a path managing section configured to manage a path using a path management table that records the path set within the transmission network between two communicating devices for data transfer together with a status of the path and the two communicating devices located at endpoints of the path; an adjacent communicating device management table configured to record combinations of the communicating devices in connected relation, statuses of the communicating devices, paths having the communicating devices located at one endpoints of the paths, group values indicating communicable ranges of the communicating devices; a path information database configured to record combinations of path information advertised from the communicating devices in connected relation, the advertising communicating devices, and the group values of the advertising communicating devices within the adjacent communicating device management table; and a path information difference table configured to record, when path information in the path information database is added or deleted or a change in group value is made in accordance with the path information advertised from the communicating devices in connected relation and fault information within the transmission network, combinations of the path information, the advertising communicating devices, an old group value, and a new group value. Once the transmitting device managing section has detected a fault within the transmission network, the path managing section determines an incommunicable path. The virtual communicating device functional section is adapted to: search for combinations of communicating devices and paths in a normal state as trees having two communicating devices of the determined path as roots of the trees while referring to the two communicating devices in the path management table and the paths in the adjacent communicating device management table; record the group values as the group values in the adjacent communicating device management table after assigning group values different for the respective trees to the communicating devices used in the trees; record, in the path information difference table after creation of the trees, the path information whose group value within the path information database is different from a group value within the adjacent communicating device management table, the group value corresponding to the communicating devices advertising the path information in the path information database; and advertise path information to communicating devices having a same group value in the adjacent communicating device management table on a basis of the path information difference table. Partial communication is thereby established within divided networks.

It should be noted that the present invention may also realize a communication system including the control device and a communication control method.

The present invention may provide a communication system in which a transmission network is managed as one virtual router (virtual communicating device), connection to adjacent routers is established through network control packets, and at a time of area division caused by a fault within the transmission network, a virtual router is the same as viewed from an adjacent router (adjacent communicating device) but the other routers (communicating devices) that the adjacent router (adjacent communicating device) communicates with change depending on an area to which the adjacent router (adjacent communicating device) belongs.

This system may provide a network that maintains communication, though a communication range is limited, at a time of area division caused by a fault within the transmission network, without changing the setting information of the adjacent routers, and that automatically restores the communication range after recovery from the fault.

BRIEF DESCRIPTION OF THE DRAWINGS

Preferred embodiments of the present invention will now be described in conjunction with the accompanying drawings, in which:

FIG. 3 is a diagram explaining a transmitting device management table;

FIG. 4 is a diagram explaining a physical link management table;

FIG. 5 is a diagram explaining an adjacent router management table;

FIG. 6 is a diagram explaining a path information database;

FIG. 7 is a diagram explaining a path management table;

FIG. 10 is a diagram explaining a path information difference table;

FIG. 12 is a flowchart of processing of setting a group number to a group value in an initialized state in the adjacent router management table;

FIG. 14 is a flowchart of processing of determining an affected path at a time of fault recovery;

FIG. 15 is a block diagram explaining a configuration of a network for data transfer when area division has occurred;

FIG. 16 is a diagram explaining the physical link management table at a time of occurrence of a fault;

FIG. 17 is a diagram explaining the path management table at the time of the occurrence of the fault;

FIG. 18 is a diagram explaining the adjacent router management table at the time of the occurrence of the fault; and FIG. 19 is a diagram explaining the path information database at the time of the occurrence of the fault.

DESCRIPTION OF THE PREFERRED EMBODIMENTS

Embodiments of the present invention will hereinafter be described in detail with reference to the drawings.

Figure 1:
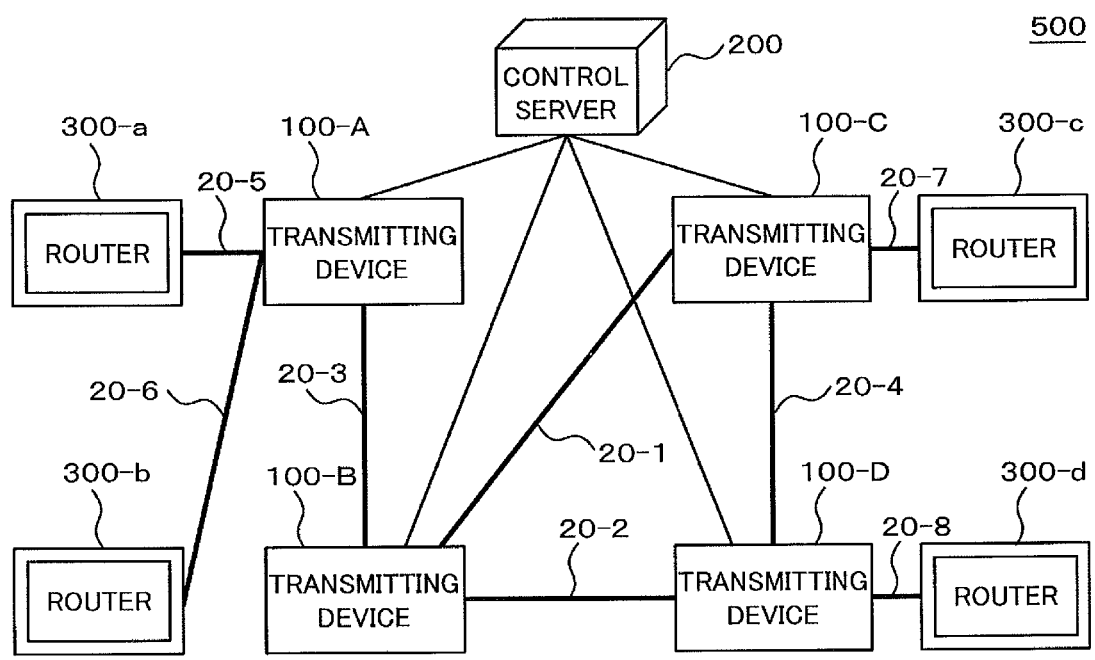
FIG. 1 is a block diagram explaining a configuration of a virtual router system.

A configuration of a virtual router system (hereinafter referred to also as a "communication system") will be described with reference to FIG. 1. In FIG. 1, the virtual router system 500 includes transmitting devices 100, a control server (hereinafter referred to also as a "control device") 200, routers (communicating devices) 300, and physical links 20. A transmitting device 100-A, a transmitting device 100-B, a transmitting device 100-C, and a transmitting device 100-D form a transmission network connected via physical links 20-1 to 20-4. The transmitting devices 100-A to 100-D and routers 300-a to 300-d are connected to each other via physical links 20-5 to 20-8. The virtual router system 500 is a network for data transfer which is formed by the routers 300-a to 300-d and the transmission network. It should be noted that in the Description and the drawings the transmitting device 100-A may be described as a transmitting device A. Moreover, the router 300-a may be described as a router a.

The transmitting devices A to D are connected to the control server 200 by another network than the transmission network. The other network may establish the connection directly by physical links or may establish the connection logically via another network such as a management network. It suffices for the logical connection between the transmitting device 100 and the control server 200 to be a connection used in a network environment including the transmission control protocol (TCP)/IP.

The transmitting device 100 relays a data packet between a router 300 and a router 300 or between a router 300 and the control server 200. At this time, when the transmitting device 100 determines from the information of the data packet received from the adjoining router (hereinafter referred to also as an "adjacent router") 300 that the data packet is a network control packet including an IP path control protocol including BGP and a signaling protocol including RSVP, the transmitting device 100 transfers the network control packet to the control server 200. The transmitting device 100 otherwise transfers the data packet to another transmitting device 100 or a router 300. In addition, when the transmitting device 100 determines from the information of a data packet received from the control server 200 that the data packet is a network control packet, the transmitting device 100 transfers the network control packet to the target adjacent router 300. In a case where the transmitting device 100 determines from the information of a data packet received from the adjacent router 300 that the data packet is a transmitting device control packet for controlling the transmitting device 100, meanwhile, the transmitting device 100 would perform appropriate processing including setting processing within the transmitting device 100 and information obtaining processing from data within the packet. The transmitting device 100 would then transmit a result of the processing to the control server 200.

Figure 2:
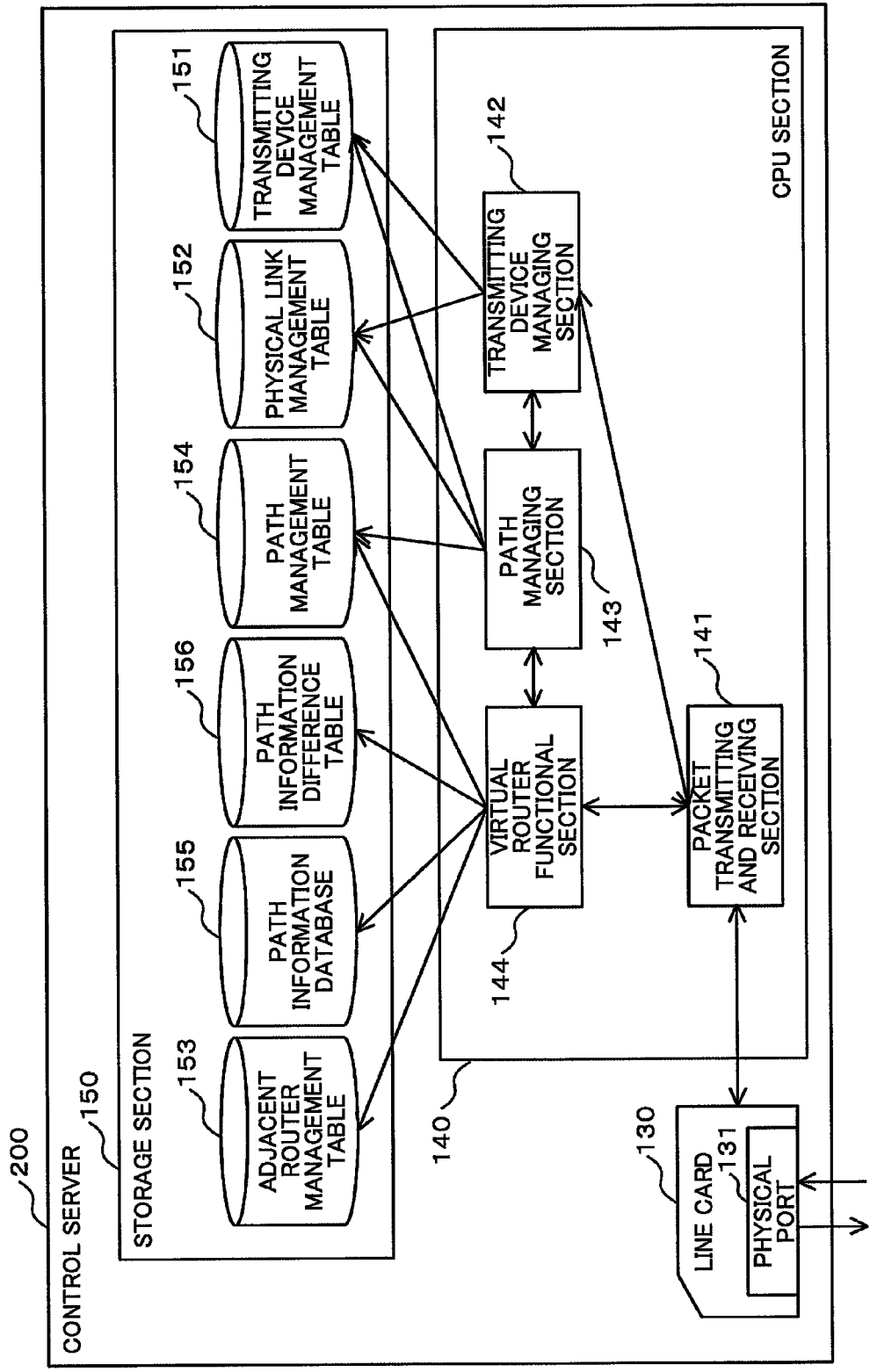
FIG. 2 is a functional block diagram explaining a configuration of a control server.

A configuration of the control server will be described with reference to FIG. 2. In FIG. 2, the control server 200 includes a line card 130, a CPU section 140, and a storage section 150. The line card 130 includes a physical port 131. The CPU section 140 includes a packet transmitting and receiving section 141, a transmitting device managing section 142, a path managing section 143, and a virtual router functional section 144. The storage section 150 stores a transmitting device management table 151, a physical link management table 152, an adjacent router management table 153, a path management table 154, a path information database 155, and a path information difference table 156.

The line card 130 transmits and receives data packets within the network. The line card 130 is connected to an external network device through a physical link 20, and is logically connected to the transmitting devices A to D directly or via the management network. The control server 200 may be provided with a plurality of line cards 130. In addition, a plurality of physical ports 131 may be included in the line card 130. In the present Description and the drawings, an identifier for identifying the physical port of the control server 200 will be written as a "line card number/physical port number".

A data packet transmitted from the transmitting device 100 is received by the line card 130. When the packet transmitting and receiving section 141 determines from the information of the data packet that the data packet is a transmitting device control packet, the packet transmitting and receiving section 141 transfers the transmitting device control packet to the transmitting device managing section 142. When the packet transmitting and receiving section 141 determines that the data packet is a network control packet, the packet transmitting and receiving section 141 transfers the network control packet to the virtual router functional section 144.

The transmitting device managing section 142 manages the transmitting device management table 151 and the physical link management table 152 in the storage section 150. The path managing section 143 manages the path management table 154 in the storage section 150. The path managing section 143 refers to the transmitting device management table 151 and the physical link management table 152 in the storage section 150. The virtual router functional section 144 manages the adjacent router management table 153, the path information database 155, and the path information difference table 156 in the storage section 150. The virtual router functional section 144 refers to the path management table 154.

The transmitting device managing section 142 analyzes the transmitting device control packet received from the packet transmitting and receiving section 141. If the transmitting device control packet includes fault occurrence information or fault recovery information, the transmitting device managing section 142 notifies the path managing section 143 of the fault occurrence information or the fault recovery information as a fault information notification that has specified the type of the fault notification (fault occurrence or fault recovery) and an affected part including device, port and link.

The notification between the transmitting device managing section 142, the path managing section 143, and the virtual router functional section 144 is realized by transmission of control packets or execution of an application programmable interface (API) provided by the transmitting device managing section 142, the path managing section 143, and the virtual router functional section 144.

The virtual router functional section 144 treats a housing link 443 (to be described later with reference to FIG. 5), through which the transmitting device 100 within the transmission network houses the adjacent router 300, as a communication line for one router 300. It further handles, as one router, the transmission and reception of network control packets to and from the adjacent router 300. The transmitting device 100 within the transmission network thereby operates as a virtual router. Therefore, the virtual router functional section 144 analyzes a network control packet received from the packet transmitting and receiving section 141. If the network control packet is a control packet for construction/maintenance of adjacency relation or existence confirmation between devices, the virtual router functional section 144 will perform processing as one virtual router. If the network control packet is path control information, the virtual router functional section 144 will record the path information in the path information database 155.

When the network control packet is a control packet including a request to generate a path between adjacent routers 300 or a request to disconnect the path, the virtual router functional section 144 notifies the path managing section 143 of the request as a path control request that specifies the type of path control (including path generation or path disconnection), the adjacent routers 441 at both ends (to be described later with reference to FIG. 5), and housing links 443.

Once the path managing section 143 receives the path control request from the virtual router functional section 144, the path managing section 143 searches for physical link information through physical links 421 in the physical link management table 152 (to be described later with reference to FIG. 4), the physical link information corresponding to the housing links 443 (specifically, a row 434 in FIG. 4 corresponds in the case of the adjacent router 300-*a* and the housing link 20-5). Thereafter it obtains information on transmitting devices 100 which is present in one of a device α 422 (to be described later with reference to FIG. 4) and a device β 423 (to be described later with reference to FIG. 4). The path managing section 143 searches for a valid transfer path between the transmitting devices 100 at both ends on the basis of the obtained information on the transmitting devices 100.

The path managing section 143 notifies the transmitting device managing section 142 of a transmitting device control request that has specified the type of the path control (path generation or path disconnection) as well as the related transmitting devices 100 and the physical links 20 involved on the basis of the retrieved transfer path between the two transmitting devices 100. The transmitting device managing section 142, after generating a transmitting device control packet on the basis of the transmitting device control request, transmits the transmitting device control packet to the transmitting devices 100 via the packet transmitting and receiving section 141. When the transmitting device managing section 142 receives, from the packet transmitting and receiving section 141, a result of processing according to the transmitting device control packet from the transmitting devices 100, the transmitting device managing section 142 notifies the path managing section 143 of the result as a consequence of the transmitting device control request. Receiving the result of the transmitting device control request, the path managing section 143 adds a row (an entry or a record) to the path management table 154 if the result is a success.

When the result of the transmitting device control request is a success, the path managing section 143 specifies the identifier of the path. When the result of the transmitting device control request is a failure, the path managing section 143 specifies information indicating the failure. The path managing section 143 then notifies the virtual router functional section 144 of the result of the path control request. Receiving the result of the path control request, the virtual router functional section 144 records the specified identifier of the path from the path managing section 143 as a usage path 444 of the adjacent routers in the adjacent router management table 153 (to be described later with reference to FIG. 5) when the result is a success.

Once the path managing section 143 receives a fault information notification from the transmitting device managing section 142, the path managing section 143 detects a path (affected path) on the basis of the type of the fault notification and the affected part, the path being affected in accordance with the contents of the fault information notification from the transmitting device management table 151 and the physical link management table 152. The path managing section 143 notifies the virtual router functional section 144 of an affected path information notification that has specified a list of affected paths to the virtual router functional section 144. Receiving the affected path information notification, the virtual router functional section 144 groups the adjacent routers 300 and limits communication ranges on the basis of the list of the affected paths.

The transmitting device management table will be described with reference to FIG. 3. The transmitting device management table 151 retains information on the transmitting devices A to D as information on the transmission network. In FIG. 3, the transmitting device management table 151 includes a transmitting device 401, a status 402, and a port (status) 403. The transmitting device management table 151 is registered in advance by an operator of the virtual router system.

The identifier of a transmitting device 100 is recorded as the transmitting device 401. The status 402 indicates the status of the transmitting device 100. The status "normal" is recorded in the status 402 when the transmitting device 100 is in a communicable state without fault. The port (status) 403 indicates the identifiers of physical ports 131 for communication lines provided on the transmitting device 100 and the states of the physical ports 131. "Normal" is recorded as the states of the ports when the ports are not faulty but are in a communicable state.

The physical link management table will be described with reference to FIG. 4. The physical link management table 152 retains information on the physical links 20 between the transmitting devices 100 and between the transmitting devices 100 and the adjacent routers 300. It should be noted that the physical link management table 152 is registered in advance by the operator of the virtual router system.

In FIG. 4, the physical link management table 152 retains a physical link 421, a device α 422, a device β 423, and a status 424. The identifier of a physical link 20 is recorded as the physical link 421. The identifiers of transmitting devices 100 or a transmitting device 100 and an adjacent router 300 located at both ends of the physical link 20 are recorded as the device α 422 and the device β 423. The status 424 indicates the status of the physical link 20. "Normal" is recorded as the status 424 when the physical link 20 is in a communicable state without fault. It should be noted that the control server 200 does not manage the ports of the routers 300. Hence, "-" is entered as the port of a router 300-a in a record (row) 434.

The adjacent router management table will be described with reference to FIG. 5. The adjacent router management table 153 retains information on the routers a to d as information on an IP network. It should be noted that the adjacent router management table 153 is registered in advance by the operator of the virtual router system.

In FIG. 5, the adjacent router management table 153 retains an adjacent router 441, a state 442, a housing link 443, usage paths 444, and a group 445. The identifier of an adjacent router 300 is recorded as the adjacent router 441. The state 442 indicates the status of the adjacent router 300. "Normal" is recorded as the state 442 when the router 300 is in a communicable state without fault and when an adjacency relation has been constructed between the adjacent router 300 and the virtual router functional section 144. The housing link 443 represents a physical link 20 connecting the adjacent router 300 to the transmitting device 100. The identifiers of paths are recorded as the usage paths 444. The number of a group to which the adjacent router 300 belongs is recorded as the group 445.

The path information database will be described with reference to FIG. 6. In FIG. 6, the path information database 155 retains network information 481, an advertising router 482, a group 483, and attribute information 484. The network information 481 is destination information on a destination of transfer known by the router 300. The advertising router 482 is the identifier of the adjacent router 300 advertising path information. The group 483 represents the number of a group to which the adjacent router 300 advertising the path information belongs. The attribute information 484 is information on other than the destination, the information including a priority and a weight.

The path management table will be described with reference to FIG. 7. In FIG. 7, the path management table 154 includes a path 461, adjacent routers 462, constituent links 463, and a status 464. The identifier of a path is recorded as the path 461. The identifiers of adjacent routers 300 at both ends of the path are recorded as the adjacent routers 462. The identifiers of physical links 20 that the path passes through are recorded as the constituent links 463. The status 464 represents the status of the path. "Normal" is recorded as the status 464 when the path is in a communicable state without fault. It should be noted that the path information difference table 156 will be described with reference to FIG. 10.

Figure 8:
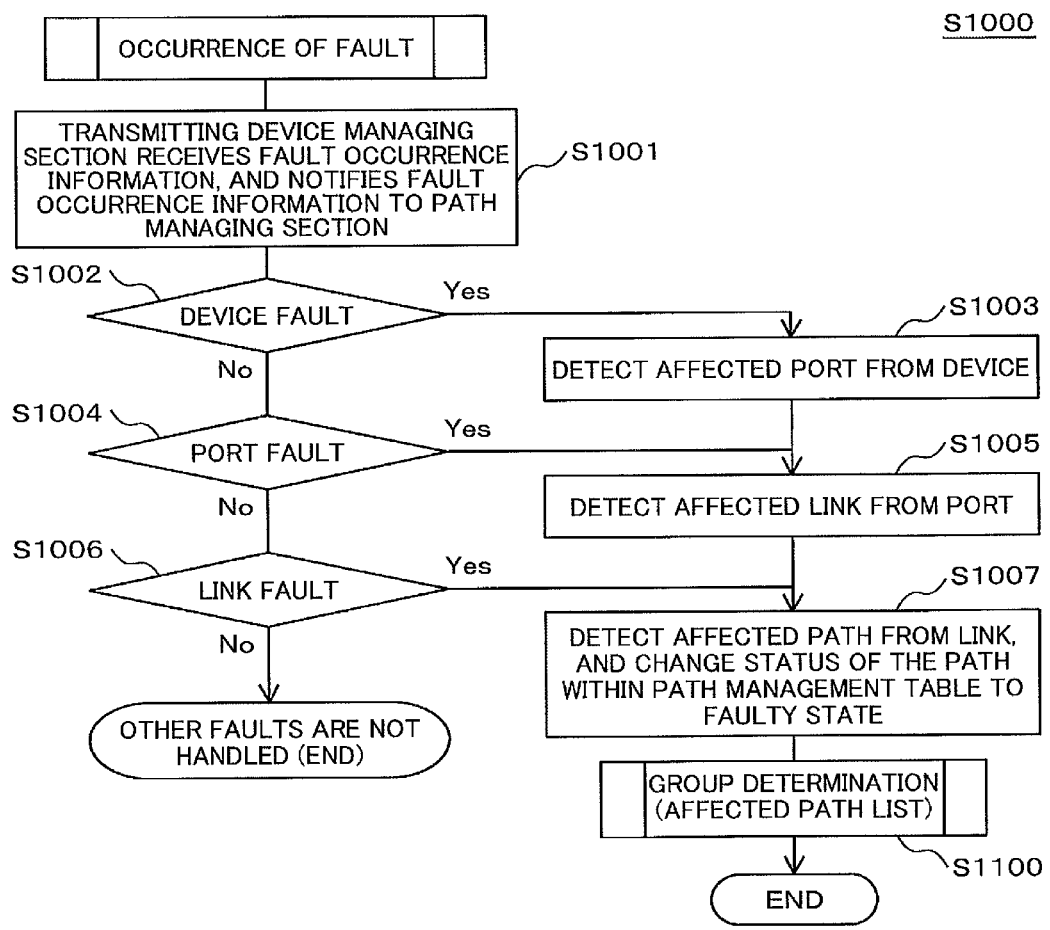
FIG. 8 is a flowchart of processing of determining an affected path at a time of occurrence of a fault.

A processing flow when a fault has occurred in the transmission network will be described with reference to FIG. 8. In FIG. 8, if some fault has occurred within the transmission network, a transmitting device 100, which has detected the occurrence of the fault, puts fault occurrence information in a transmitting device control packet and transmits the transmitting device control packet to the control server 200. The transmitting device managing section 142 receives the transmitting device control packet. The transmitting device managing section 142 detects that the fault has occurred from the transmitting device control packet, and notifies the path managing section 143 of a fault information notification (S1001).

The path managing section 143 analyzes the fault information notification to determine whether the fault is a device fault in which the identifier of a transmitting device 100 is specified as an affected part (S1002). If a result of the determination is Yes, the path managing section 143 changes the values of the status 402 and the ports (statuses) 403 in a row, including the identifier of the transmitting device 100 in the transmitting device management table 151, to a fault, and obtains a list of the ports (statuses) 403 as a list of affected ports (S1003).

In a case of No in step 1002, the path managing section 143 would determine whether the fault is a port fault in which the identifiers of a transmitting device 100 and a port are specified as the affected part in the fault information notification (S1004). If a result of the determination is Yes, after step 1003, the path managing section 143 changes the value of the port (status) 403 in a row, including the identifier of the transmitting device 100 in the transmitting device management table 151, to a fault; sets the port in a list of affected ports; changes the value of the status 424 in a row including the identifiers of the transmitting device 100 and the port in either the device α 422 or the device β 423 in the physical link management table 152 to a fault; and obtains a list of the physical link 421 in the row, in which the status 424 is changed to "faulty" in the processing, as a list of affected links (S1005).

In a case of No in step 1004, the path managing section 143 determines whether the fault is a link fault in which the identifier of a physical link is specified as the affected part in the fault information notification (S1006). If a result of the determination is Yes, after step 1005, the path managing section 143 changes the value of the status 424 in a row including the identifier of the physical link in the physical link management table 152 to a fault; sets the identifier of the physical link in a list of affected links; changes the value of the status 464 in a row, including the identifier of the physical link 20 in the constituent links 463 of the path management table 154, to a fault; obtains a list of the path 461 in the row in which the status 464 is changed to a fault in the processing as a list of affected paths (affected path list), and notifies the virtual router functional section 144 of an affected path information notification that has specified the affected path list (S1007). The virtual router functional section 144, after obtaining the affected path list from the affected path information notification received from the path managing section 143, performs group determination processing for the adjacent routers 300 (S1100). Then the processing will be ended. In a case of No in step 1006, the path managing section 143 will terminate the processing.

It should be noted that when changes are made to a fault in step 1003 or step 1005, changes to a fault in step 1005 or step 1007 are read as maintaining of the fault.

Figure 9:
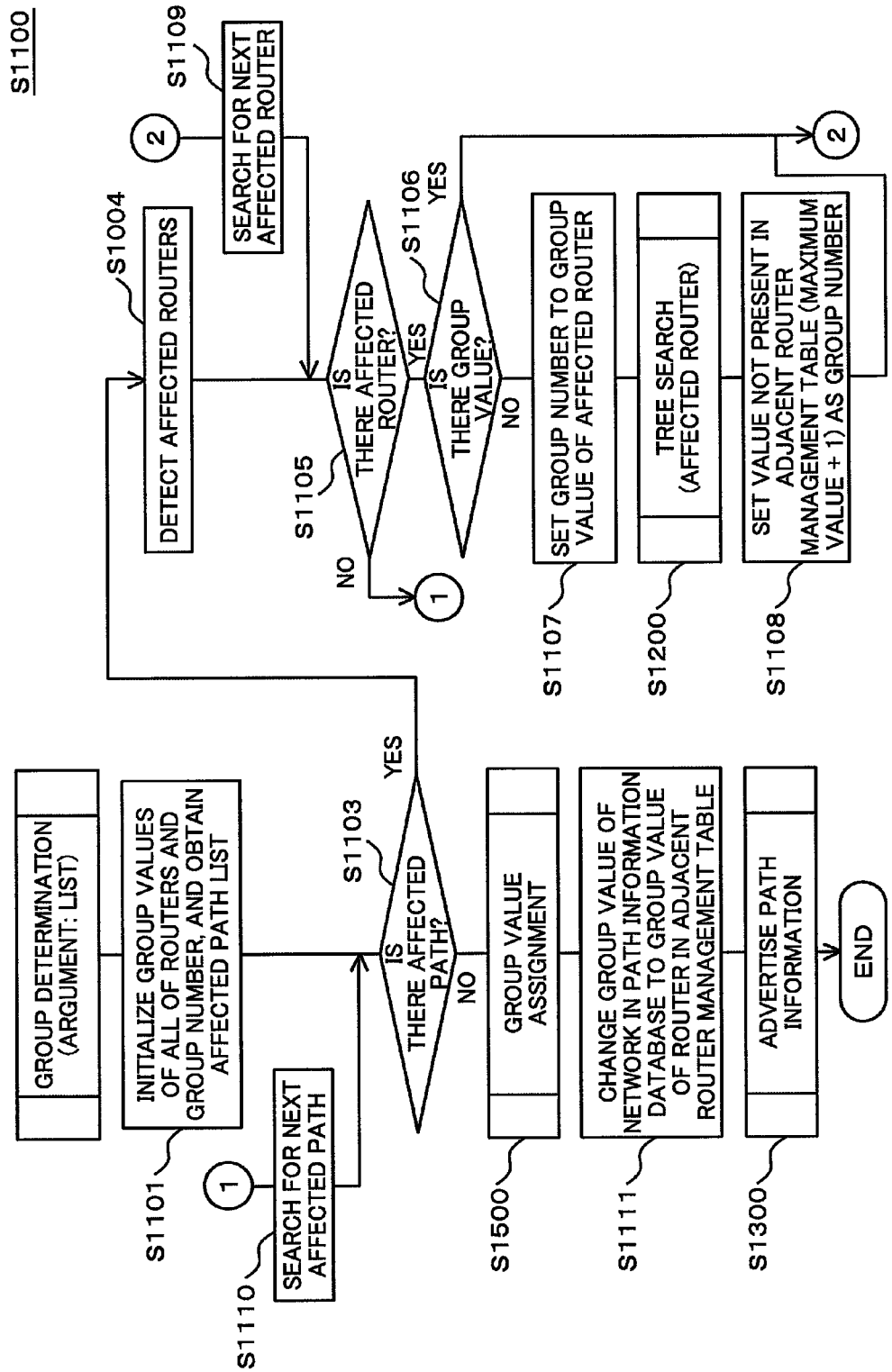
FIG. 9 is a flowchart of processing of group determination for adjacent routers.

A processing flow of group determination for the adjacent routers 300 will be described with reference to FIG. 9. In FIG. 9, the virtual router functional section 144 obtains the affected path list from the affected path information notification received from the path managing section 143, initializes the values of groups 445 of all of the routers within the adjacent router management table 153 (specifically sets zero as the values), and also initializes a group number to be used as the value of a group 445 (specifically sets one as the group number) (S1101).

The virtual router functional section 144 searches from the beginning of the affected path list to determine whether there is an affected path (S1103). If there is an affected path, the virtual router functional section 144 removes the affected path from the affected path list, and obtains the identifiers of the adjacent routers 462 in a row including the identifier of the affected path within the path management table 154 as a list of affected routers (affected router list) (S1004). Here, the affected routers are routers constituting the path in which the fault has occurred.

The virtual router functional section 144 searches from the beginning of the affected router list to determine whether there is an affected router (S1105). If there is an affected router, the virtual router functional section 144 removes the affected router from the affected router list, and determines whether the group 445 in a row including the identifier of the affected router in the adjacent router management table 153 is not yet set (initialized state) (S1106). If the group 445 is not yet set with no group value, the virtual router functional section 144 sets the group number to the group 445 of the affected router in the adjacent router management table 153 (S1107). The virtual router functional section 144 performs tree search processing to search for a tree having the affected router as a root and set the same group number as that of the affected router to an adjacent router in a state of being communicable with the affected router (S1200).

The virtual router functional section 144 sets, as the group number, a value not included in the values of the groups 445 within the adjacent router management table 153 (specifically a value obtained by addition of one to a maximum value of the groups 445) (S1108). The virtual router functional section 144 searches for a next affected router (S1109) through the affected router list.

If a value is set to the group 445 in the row including the identifier of the affected router in the adjacent router management table 153 (group value is set) in step 1106, the virtual router functional section 144 does not make the search because the affected router has already been grouped in the tree search processing for another adjacent router, and therefore the process is moved to step 1109. If there is no affected router in step 1105, the virtual router functional section 144 searches for a next affected path (S1110) through the affected path list.

If there is no affected path in step 1103, the virtual router functional section 144 performs group value assignment processing to set another group number (specifically, increment of one by one) to each of adjacent routers 300 to which the value of the group 445 within the adjacent router management table 153 is not yet set (S1500).

The virtual router functional section 144 detects path information in the path information database 155, the path information having a different combination of an advertising router 482 and a group 483 from a combination of an adjacent router 441 and a group 445 in the adjacent router management table 153; empties the path information difference table 156; adds a row in the path information difference table 156; and records the different path information in network information 501 (to be described later with reference to FIG. 10). The same applies to the following ones: an advertising router 502; an old group 503; and a new group 504. The virtual router functional section 144 sets the value of the group 483 in the different path information in the path information database 155 to the value of the new group 504 (S1111).

The virtual router functional section 144 creates the path information difference table 156 on the basis of all the different path information, thereafter performs path information advertisement processing to advertise the changed path information to all of the adjacent routers 300 (S1300), and terminates the group determination processing.

The path information difference table will be described with reference to FIG. 10. In FIG. 10, the path information difference table 156 retains network information 501, an advertising router 502, an old group 503, and a new group 504. The network information 481 of different path information is recorded as the network information 501. The advertising router 482 of the different path information is recorded as the advertising router 502. The group 483 of the different path information is recorded as the old group 503. The group 445 in a row in the adjacent router management table 153 is recorded as the new group 504, the table having the identifier of the advertising router 502 of the different path information.

Figure 11:
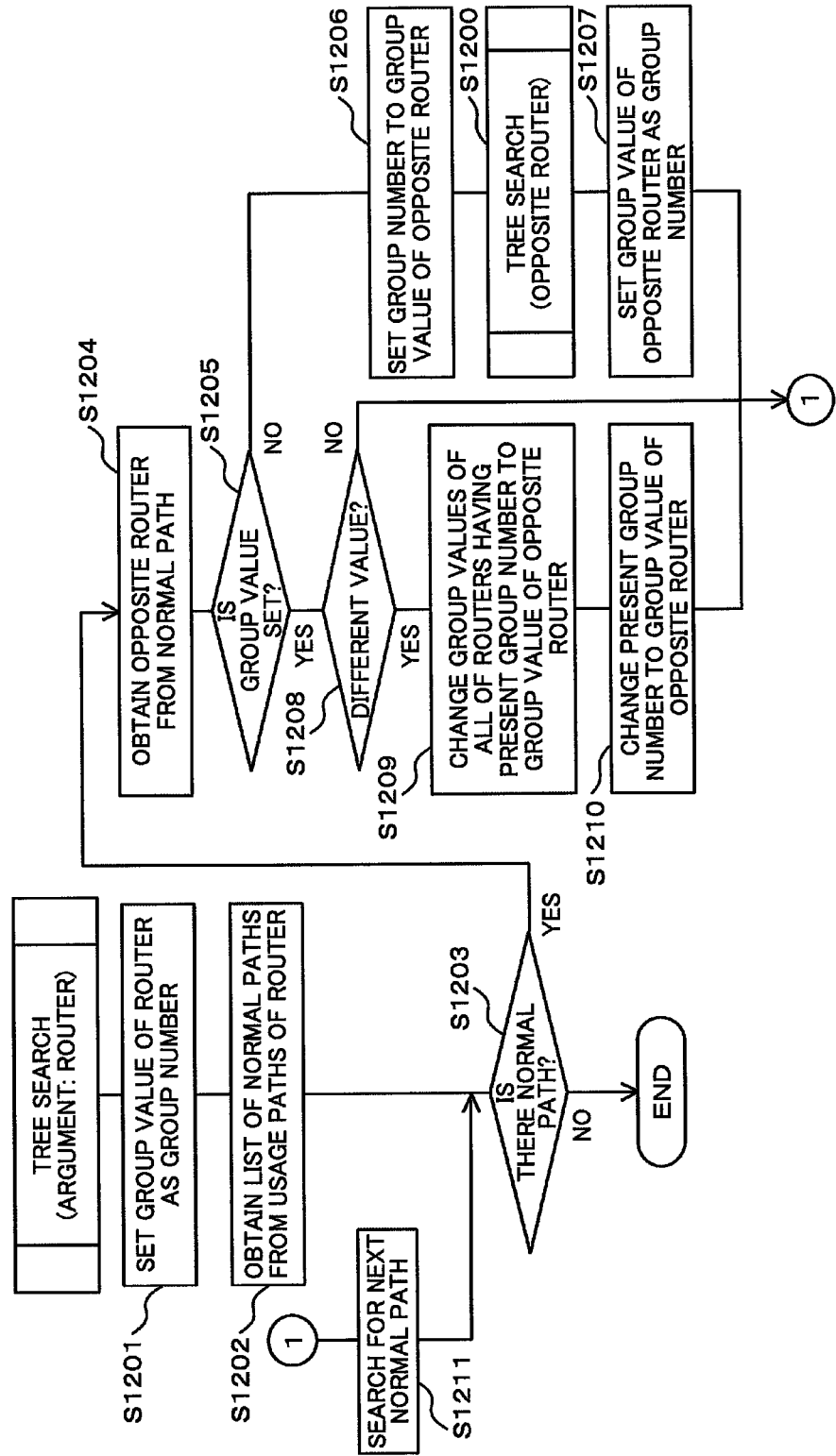
FIG. 11 is a flowchart of router tree search processing based on a valid path.

A processing flow for searching for a tree formed by a valid path and adjacent routers 300 from a router 300 specified as an argument will be described with reference to FIG. 11. In FIG. 11, the virtual router functional section 144 sets, as a group number to be used as the value of a group of adjacent routers 300 communicable with each other, the value of the group 445 in a row having the identifier of the router 300 specified as the argument as the adjacent router 441 in the adjacent router management table 153 (S1201). The virtual router functional section 144 obtains a list of usage paths 444 in the row having the identifier of the router 300, refers to the statuses 464 of paths corresponding to the list of the usage paths in the path management table 154, and obtains a list of paths whose statuses 464 are normal as a normal path list (S1202).

The virtual router functional section 144 searches from the beginning of the normal path list to determine whether there is a normal path (S1203). If there is a normal path, the virtual router functional section 144 removes the normal path from the normal path list, refers to the adjacent routers 462 in a row including the identifier of the normal path in the path management table 154, and obtains, as the identifier of an opposite router 300, the identifier of the adjacent router 300 which is not the identifier of the specified router 300 (S1204). Here, the opposite router is one of the routers at both ends of the path and is the router at the other end than that of the router of interest.

The virtual router functional section 144 obtains the value of the group of the opposite router 300 from the adjacent router management table 153, and determines whether the value of the group is not yet set (S1205). If the group value is not set, the virtual router functional section 144 sets the group number to the group 445 in the row of the opposite router 300 obtained as the identifier of the adjacent router 441 in the adjacent router management table 153 (S1206). The virtual router functional section 144 performs tree search processing with the opposite router 300 as a root (S1200). The virtual router functional section 144 sets, as the group number, the value of the group 445 of the opposite router 300 obtained as the identifier of the adjacent router 441 within the adjacent router management table 153 (S1207). The virtual router functional section 144 searches for a next normal path through the normal path list (S1211), and then makes a transition to step 1203.

If the group value has been set (present) in step 1205, the virtual router functional section 144 determines whether the group value is different from the group number (S1208). When a result of the determination is No, the virtual router functional section 144 makes a transition to step 1211. When the group value is different from the group number (Yes) in step 1208, it means that a connection to another group has been established. The virtual router functional section 144 thus changes all of the values of the groups 445 within the adjacent router management table 153, the values being equal to the group number, to the value of the group 445 in a row having the identifier of the opposite router 300 (S1209). The virtual router functional section 144 also changes the group number to the value of the group 445 in the row having the identifier of the opposite router 300 (S1210), and then makes a transition to step 1211. If there is no normal path in step 1203, the virtual router functional section 144 terminates the tree search processing.

In the present embodiment, the tree search processing is performed by a depth-first search algorithm based on a nested structure. However, another algorithm may be used as long as grouping may be realized by searching of trees on the basis of combinations of valid paths and adjacent routers 300.

A processing flow for setting a group value to an adjacent router to which a group value is not yet set within the adjacent router management table will be described with reference to FIG. 12. In FIG. 12, the virtual router functional section 144 searches for the identifier of an adjacent router 300 to which a group 445 is not yet set (in an initialized state) within the adjacent router management table 153, obtains the identifier of the adjacent router 300 as a list of routers 300 (router list), and sets a maximum value of the groups 445 within the adjacent router management table 153 as the group number (S1501). The virtual router functional section 144 searches from the beginning of the router list to determine whether there is a router 300 (S1502). If there is a router 300, the virtual router functional section 144 removes the router 300 from the router list, increments the group number one by one, and sets the group number to the group 445 of the router 300 within the adjacent router management table 153 (S1503). The virtual router functional section 144 performs tree search processing with the router 300 as a root (S1200), and then makes a transition to step 1502. If there is no router 300 in step 1502, the virtual router functional section 144 terminates the group value assignment processing.

Figure 13:
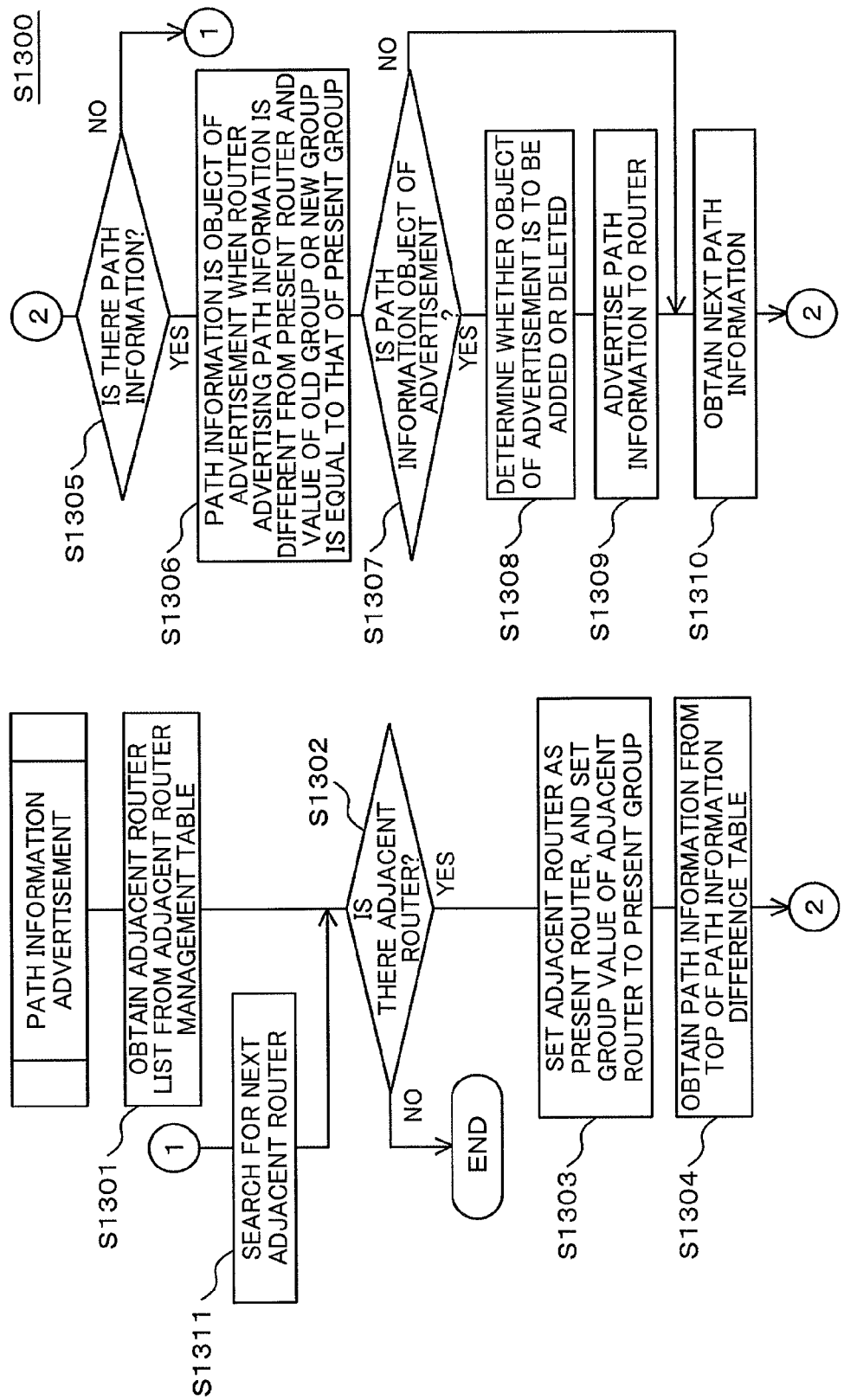
FIG. 13 is a flowchart of path information advertisement processing.

A processing flow for advertising changed path information to all of the adjacent routers will be described with reference to FIG. 13. In FIG. 13, the virtual router functional section 144 obtains a list of adjacent routers 441 whose statuses 442 are normal as an adjacent router list from the adjacent router management table 153 (S1301). The virtual router functional section 144 searches from the beginning of the adjacent router list to determine whether there is an adjacent router 300 (S1302). If there is an adjacent router 300, the virtual router functional section 144 removes the router 300 from the router list, sets the identifier of the adjacent router 300 as a present router 300, and sets the value of the group 445 of the adjacent router 300 in the adjacent router management table 153 as a present group (S1303). Here, the present router and the present group are a router of interest and a group of interest, respectively.

The virtual router functional section 144 obtains path information (row 513, 514, or the like) from the beginning of the path information difference table 156 (S1304). The virtual router functional section 144 determines whether there is path information (S1305). If an advertising router 502 in the path information is different from the value of the present router 300, and the value of an old group 503 or a new group 504 in the path information is equal to that of the present group, the virtual router functional section 144 determines that the path information is an object of advertisement (S1306).

The virtual router functional section 144 determines whether the path information is an object of advertisement (S1307). When a result of the determination is Yes, it is determined that the path information is to be deleted in a case where the value of the old group 503 in the path information and the value of the present group are equal to each other, or otherwise it is determined that the path information is to be added (S1308). The virtual router functional section 144 advertises, to the adjacent router 300, information in a row having a combination of network information 481 and an advertising router 482 within the path information database 155, the combination being equal to the combination of the network information 501 and the advertising router 502 of the path information (S1309). The virtual router functional section 144 obtains next path information from the path information difference table 156 (S1310), and then makes a transition to step 1305. If the path information is not an object of advertisement in step 1307, the virtual router functional section 144 makes a transition to step 1310.

If there is no path information left in step 1305 after path information down to an end of the path information difference table 156 has been obtained, the virtual router functional section 144 makes a transition to step 1311. In step 1302, the virtual router functional section 144 searches from the beginning of the adjacent router list, and if there is no adjacent router 300, the virtual router functional section 144 terminates the path information advertisement processing.

A processing flow when recovery from a fault has been achieved in the transmission network will be described with reference to FIG. 14. In FIG. 14, when recovery from a fault has been achieved within the transmission network, a transmitting device 100, which has detected the fault recovery, puts fault recovery information in a transmitting device control packet and transmits the transmitting device control packet to the control server 200. The transmitting device managing section 142 receives the transmitting device control packet. The transmitting device managing section 142, after detecting that recovery from the fault has been achieved from the transmitting device control packet, notifies the path managing section 143 of a fault information notification (S1401).

The path managing section 143 analyzes the fault information notification to determine whether the fault is a device fault in which the identifier of a transmitting device 100 is specified as an affected part (S1002). When a result of the determination is Yes, the path managing section 143 changes the values of a status 402 and ports (statuses) 403 in a row, including the identifier of the transmitting device 100 in the transmitting device management table 151, to the normal value and obtains a list of the ports (statuses) 403 as a list of affected ports (S1403).

In a case of No in step 1002, the path managing section 143 determines whether the fault is a port fault in which the identifiers of a transmitting device 100 and a port are specified as the affected part in the fault information notification (S1004). When a result of the determination is Yes, after step 1003, the path managing section 143 changes the value of the port (status) 403 in a row, including the identifier of the transmitting device 100 in the transmitting device management table 151, to the normal value, and sets the port in a list of affected ports. The path managing section 143 obtains, from a row including the identifiers of the transmitting device 100 and the port in either the device α 422 or the device β 423 in the physical link management table 152, the identifiers of an opposite transmitting device and a port in the device α 422 or the device β 423 that does not have the identifiers of the transmitting device 100 and the port. If a port (status) 403 having the identifiers of the opposite transmitting device and the port within the transmitting device management table 151 is also normal, the path managing section 143 changes the value of a status 424 in the row, including the identifiers of the transmitting device 100 and the port in the physical link management table 152, to the normal value, and obtains a list of a physical link 421 in the row in which the status 424 is changed to "normal" in the processing as a list of affected links (S1405). Here, the opposite transmitting device is one of the transmitting devices connected to routers at both ends of the path and is the transmitting device at the other end side than that of the transmitting device of interest.

In a case of No in step 1004, the path managing section 143 determines whether the fault is a link fault in which the identifier of a physical link 20 is specified as the affected part in the fault information notification (S1006). When a result of the determination is Yes, after step 1005, the path managing section 143 changes the value of the status 424 in a row, including the identifier of the physical link 20 in the physical link management table 152, to the normal value, and sets the identifier of the physical link 20 in a list of affected links. If the statuses 424 of other physical links 20 than the physical link 20 in the physical link management table 152, the other physical links 20 being in a row including the identifier of the physical link 20 in the constituent links 463 in the path management table 154, are all normal, the path managing section 143 changes the value of the status 464 to the normal value. The path managing section 143 obtains a list of the path 461 in the row in which the status 464 is changed to "normal" in the processing as a list of affected paths (affected path list), and notifies the virtual router functional section 144 of an affected path information notification that has specified the affected path list (S1407). The virtual router functional section 144 obtains the affected path list from the affected path information notification received from the path managing section 143, and performs group determination processing for the adjacent routers 300 (S1100).

After the group determination processing at the time of the fault recovery, addition of normal paths connects the area-divided groups to each other to form the same group. Path information is thus added so that recovery to a state before the fault is achieved. Therefore, the same processing may be implemented after the group determination in either of cases of fault occurrence and fault recovery.

The network for data transfer when a fault has occurred and area division is thereby caused will be described with reference to FIG. 15. Before the occurrence of the fault, an adjacency relation is constructed by a BGP route reflection function as an example between the virtual router functional section 144 on the control server 200 and the adjacent routers a to d. The data from FIG. 3 to FIG. 6 is set in the storage section 150 on the control server 200. When the fault has occurred, the transmitting device managing section 142 changes the physical link management table 152 and the path management table 154 to contents shown in FIG. 16 and FIG. 17, respectively. The virtual router functional section 144 subsequently changes the adjacent router management table 153 and the path information database 155 to contents shown in FIG. 18 and FIG. 19, respectively.

In FIG. 15, the physical links 20-1 and 20-2 have become unable to communicate due to some factor. The transmitting device 100-B, the transmitting device 100-C, and the transmitting device 100-D detect the status of the physical links as a link fault.

The transmitting device managing section 142 notifies the path managing section 143 of a fault information notification indicating the link fault of the physical links 20-1 and 20-2 (S1001 in FIG. 8). The path managing section 143 changes the physical link management table 152 to the contents shown in FIG. 16 (changes the statuses 424 of the physical links 20-1 and 20-2 from "normal" to "faulty"), changes the path management table 154 to the contents shown in FIG. 17 (changes the statuses 464 of the paths 30-2 and 30-3 from "normal" to "faulty"), creates an affected path list, and notifies the virtual router functional section 144 of an affected path information notification (S1007).

The virtual router functional section 144 performs group determination processing (S1100 in FIG. 9). The virtual router functional section 144 makes a tree search with an affected router detected from the affected path list as a root (S1200 in FIG. 11). The virtual router functional section 144 changes the adjacent router management table 153 to the contents shown in FIG. 18 (changes the groups 445 of the adjacent routers c and d from 1 to 2). The virtual router functional section 144 creates the path information difference table 156 including the contents shown in FIG. 10. The virtual router functional section 144 changes the path information database 155 to the contents shown in FIG. 19 (changes the groups 483 of path information 493 [whose network information 481 is Y and whose advertising router 482 is the router c] and path information 494 [whose network information 481 is W and whose advertising router 482 is the router d] from 1 to 2) (S1111 in FIG. 9).

As a result of this series of flows, the groups of the adjacent routers 300 capable of communicating with each other are the group 1 of the adjacent router 300-*a* and the adjacent router 300-*b* and the group 2 of the adjacent router 300-*c* and the adjacent router 300-*d*. The virtual router functional section 144 on the control server 200 advertises to the adjacent router 300-*a* and the adjacent router 300-*b* that path information related to the adjacent router 300-*c* and the adjacent router 300-*d* has been deleted. The virtual router functional section 144 advertises to the adjacent router 300-*c* and the adjacent router 300-*d* that path information related to the adjacent router 300-*a* and the adjacent router 300-*b* has been deleted (S1300 in FIG. 13).

What is claimed is:

1. A communication system comprising:
    a transmission network including a plurality of transmitting devices configured to set in advance information on data to be transferred in an entry device and an exit device and transfer the data;
    an IP network including a plurality of communicating devices configured to determine a destination of data transfer on a basis of an IP address;
    and a control device configured to manage the transmitting devices and connect the transmitting devices and the communicating devices by use of network control packets on the IP network;
    the transmitting devices transferring the network control packets transmitted by the communicating devices to the control device,
    the control device treating the transmission network as one virtual communicating device, converting information on the plurality of transmitting devices into the network control packets, and being connected to the communicating devices,
    the control device including
        a transmitting device managing section configured to control and manage the plurality of transmitting devices, a virtual communicating device functional section connected to the plurality of communicating devices with the network control packets, and a path managing section configured to manage a path using a path management table that records the path set within the transmission network between two communicating devices for data transfer together with a status of the path and the two communicating devices located at endpoints of the path, the virtual communicating device functional section including an adjacent communicating device management table configured to record combinations of the communicating devices in connected relation, statuses of the communicating devices, paths having the communicating devices located at one endpoints of the paths, group values indicating communicable ranges of the communicating devices, a path information database configured to record, in combination with one another, path information advertised from the communicating devices in connected relation, the advertising communicating devices, and the group values of the advertising communicating devices within the adjacent communicating device management table, and a path information difference table configured to record, when path information in the path information database is added or deleted or a change in group value is made in accordance with the path information advertised from the communicating devices in connected relation and fault information within the transmission network, the path information, the advertising communicating devices, an old group value, and a new group value in combination with one another, wherein, once the transmitting device managing section has detected a fault within the transmission network, the path managing section determines an incommunicable path, the virtual communicating device functional section is adapted to:

search for combinations of communicating devices and paths in a normal state as trees having two communicating devices of the determined path as roots of the trees while referring to the two communicating devices in the path management table and the paths in the adjacent communicating device management table;

record the group values as the group values in the adjacent communicating device management table after assigning group values different for the respective trees to the communicating devices used in the trees;

record, in the path information difference table after creation of the trees, the path information whose group value within the path information database is different from a group value within the adjacent communicating device management table, the group value corresponding to the communicating devices advertising the path information in the path information database; and advertise path information to communicating devices having a same group value in the adjacent communicating device management table on a basis of the path information difference table, and partial communication is thereby established within divided networks.

2. The communication system according to claim 1, wherein for the network control packets, Resource Reservation Protocol is used as a protocol to be operatively associated with control of the paths, and Border Gateway Protocol is used as a protocol for constructing connected relation to the communicating devices.

3. The communication system according to claim 2, wherein a route reflection function of the Border Gateway Protocol is used for controlling the connected relation to the communicating devices.

4. A communication control method in a communication system, the communication system comprising:

a transmission network including a plurality of transmitting devices configured to set in an entry device and an exit device information on data to be transferred in advance and transfer the data;

an IP network including a plurality of communicating devices configured to determine a destination of data transfer on a basis of an IP address; and a control device configured to manage the transmitting devices and connect the transmitting devices and the communicating devices by use of network control packets on the IP network, the transmitting devices transferring the network control packets transmitted by the communicating devices to the control device, the control device treating the transmission network as one virtual communicating device, converting information on the plurality of transmitting devices into the network control packets, and being connected to the communicating devices, the control device including:

a transmitting device managing section configured to control and manage the plurality of transmitting devices;

a virtual communicating device functional section connected to the plurality of communicating devices by use of the network control packets; and a path managing section configured to manage a path using a path management table that records the path set within the transmission network between two communicating devices for data transfer together with a status of the path and the two communicating devices located at endpoints of the path, and the virtual communicating device functional section including:

an adjacent communicating device management table configured to record combinations of the communicating devices in connected relation, statuses of the communicating devices, paths having the communicating devices located at one endpoints of the paths, group values indicating communicable ranges of the communicating devices;

a path information database configured to record, in combination with one another, path information advertised from the communicating devices in connected relation, the advertising communicating devices, and the group values of the advertising communicating devices within the adjacent communicating device management table; and a path information difference table configured to record, when path information in the path information database is added or deleted or a change in group value is made in accordance with the path information advertised from the communicating devices in connected relation and fault information within the transmission network, the path information, the advertising communicating devices, an old group value, and a new group value in combination with one another, the communication control method, once the transmitting device managing section has detected a fault within the transmission network, comprising the steps of:

determining an incommunicable path;

searching for combinations of communicating devices and paths in a normal state as trees having two communicating devices of the determined path as roots of the trees while referring to the two communicating devices in the path management table and the paths in the adjacent communicating device management table;

recording the group values as the group values in the adjacent communicating device management table after assigning group values different for the respective trees to the communicating devices used in the trees;

recording, in the path information difference table after creation of the trees, the path information whose group value within the path information database is different from a group value within the adjacent communicating device management table, the group value corresponding to the communicating devices advertising the path information in the path information database;

advertising path information to communicating devices having a same group value in the adjacent communicating device management table on a basis of the path information difference table; and establishing partial communication within divided networks.

5. A control device in a communication system, the communication system comprising:

a transmission network including a plurality of transmitting devices configured to set in advance information on data to be transferred in an entry device and an exit device and transfer the data;

an IP network including a plurality of communicating devices configured to determine a destination of data transfer on a basis of an IP address;

and the control device configured to manage the transmitting devices and connect the transmitting devices and the communicating devices by use of network control packets on the IP network, the control device treating the transmission network as one virtual communicating device, converting information on the plurality of transmitting devices into the network control packets, and being connected to the communicating devices, the control device comprising:

a transmitting device managing section configured to control and manage the plurality of transmitting devices;

a virtual communicating device functional section connected to the plurality of communicating devices by use of the network control packets;

a path managing section configured to manage a path using a path management table that records the path set within the transmission network between two communicating devices for data transfer together with a status of the path and the two communicating devices located at endpoints of the path;

an adjacent communicating device management table configured to record combinations of the communicating devices in connected relation, statuses of the communicating devices, paths having the communicating devices located at one endpoints of the paths, group values indicating communicable ranges of the communicating devices;

a path information database configured to record combinations of path information advertised from the communicating devices in connected relation, the advertising communicating devices, and the group values of the advertising communicating devices within the adjacent communicating device management table; and a path information difference table configured to record, when path information in the path information database is added or deleted or a change in group value is made in accordance with the path information advertised from the communicating devices in connected relation and fault information within the transmission network, combinations of the path information, the advertising communicating devices, an old group value, and a new group value;

wherein, once the transmitting device managing section has detected a fault within the transmission network, the path managing section determines an incommunicable path, the virtual communicating device functional section is adapted to:

search for combinations of communicating devices and paths in a normal state as trees having two communicating devices of the determined path as roots of the trees while referring to the two communicating devices in the path management table and the paths in the adjacent communicating device management table;

record the group values as the group values in the adjacent communicating device management table after assigning group values different for the respective trees to the communicating devices used in the trees;

record, in the path information difference table after creation of the trees, the path information whose group value within the path information database is different from a group value within the adjacent communicating device management table, the group value corresponding to the communicating devices advertising the path information in the path information database; and advertise path information to communicating devices having a same group value in the adjacent communicating device management table on a basis of the path information difference table, and partial communication is thereby established within divided networks.

* * * * *